United States Patent
Pratt et al.

(10) Patent No.: US 6,406,808 B1
(45) Date of Patent: Jun. 18, 2002

(54) METHOD AND APPARATUS FOR THERMAL MANAGEMENT OF FUEL CELL SYSTEMS

(75) Inventors: Steven D. Pratt, Plantation; Ronald J. Kelley, Coral Springs; Sivakumar Muthuswamy, Plantation; Robert W. Pennisi, Boca Raton, all of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/546,337

(22) Filed: Apr. 10, 2000

(51) Int. Cl.⁷ ............................................... H01M 8/04
(52) U.S. Cl. .......................................................... 429/26
(58) Field of Search ............................... 429/12, 13, 22, 429/24, 26

(56) References Cited

U.S. PATENT DOCUMENTS

| | | | | |
|---|---|---|---|---|
| 3,801,372 A | * | 4/1974 | Shaw | 136/86 |
| 4,826,741 A | | 5/1989 | Aldhart et al. | 429/19 |
| 5,783,324 A | | 7/1998 | Binder et al. | 429/31 |
| 6,007,931 A | * | 12/1999 | Fuller et al. | 429/13 |
| 6,017,646 A | * | 1/2000 | Prasad et al. | 429/13 |
| 6,110,613 A | * | 8/2000 | Fuller | 429/17 |

* cited by examiner

Primary Examiner—Patrick Ryan
Assistant Examiner—M. Wills
(74) Attorney, Agent, or Firm—Dale W. Dorinski; Randi L. Dulaney

(57) ABSTRACT

A method and apparatus for managing thermal performance of a fuel cell system having a fuel cell assembly and a fuel storage container is disclosed. The fuel cell system 100 consists of one or more fuel cells 110, each having a major surface 140, and disposed next to each other in a side-by-side adjacent arrangement and a fuel storage container 120 having an exterior wall 150. The fuel cells 110 are positioned such that distance between the major surfaces 140 and the fuel storage container wall 150 along a direction normal to the major surfaces is substantially the same. In addition, one or more of the fuel cells are in thermal contact with the fuel storage container such that cell waste heat is transferred to the fuel storage container.

22 Claims, 4 Drawing Sheets

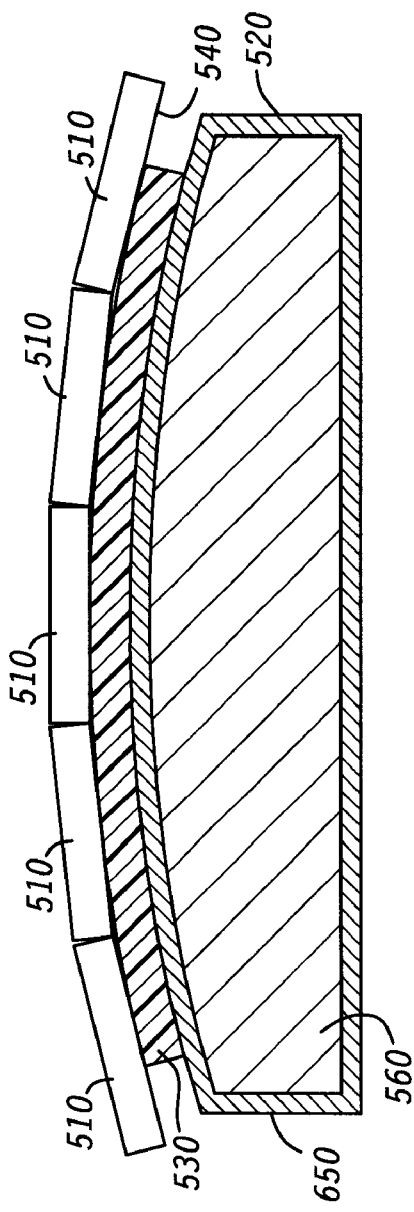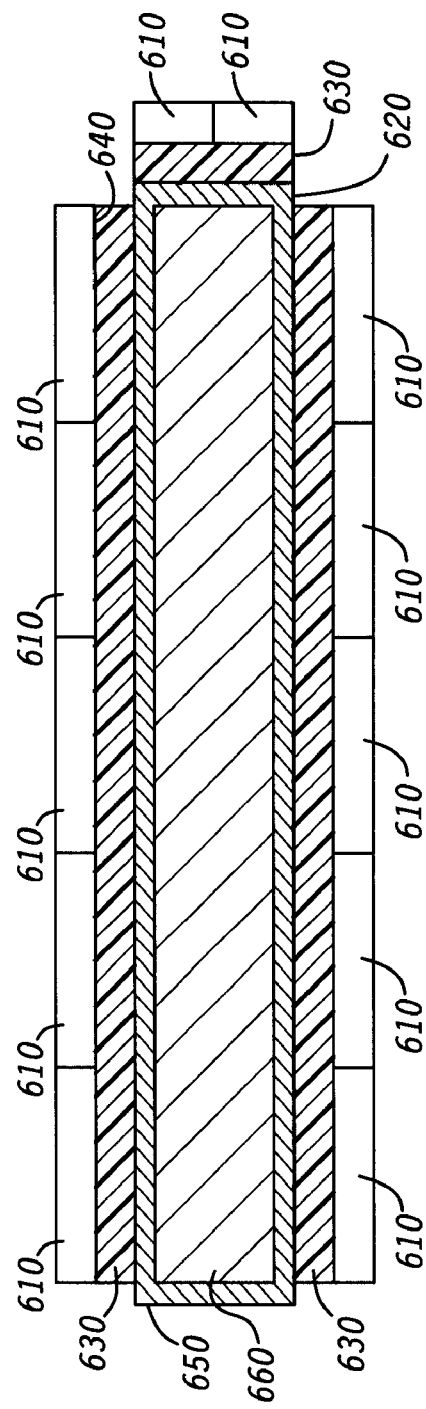

METHOD AND APPARATUS FOR THERMAL MANAGEMENT OF FUEL CELL SYSTEMS

TECHNICAL FIELD

This invention relates to fuel cells in general and a method of managing the temperature level of a fuel cell in particular.

BACKGROUND

Fuel cells are electrochemical cells in which a free energy change resulting from a fuel oxidation reaction is converted into electrical energy. A typical fuel cell consists of a fuel electrode (anode) and an oxidant electrode (cathode), separated by an ion-conducting electrolyte. The electrodes are connected electrically to a load (such as an electronic circuit) by an external circuit conductor. In practice, a number of these unit fuel cells are normally stacked or ganged together to form a fuel cell assembly. A number of individual cells are electrically connected in series by abutting the anode current collector of one cell with the cathode current collector of its nearest neighbor in the stack. An alternate style of fuel cell has been recently proposed (U.S. Pat. No. 5,783,324) which is a side-by-side adjacent configuration in which a number of individual cells are placed next to each other in a planar arrangement. This is an elegant solution to the problems of gas transport and complexity of mechanical hardware.

The electrochemical reaction in a fuel cell is exothermic. The thus released heat must be removed from the fuel cell to avoid overheating of the latter. One of the ways of removing heat according to prior art is by using electrically conductive heat exchanger plates through which a cooling fluid flows. In this case, both sides of the membrane-electrode unit are in contact with the electrically conductive plate. Another prior art approach to cooling that is typical in a fuel cell stack is to use a dedicated coolant means in between individual fuel cells in stack. The dedicated coolant means is used to transport fluids through the fuel cell, which in turn removes the heat from the cells.

Fuel cell and stack designs having conventional cooling means such as the ones described above have several inherent disadvantages. First, conventional designs typically employ liquid cooling systems for regulating the cells' operating temperature. Liquid cooling systems are disadvantageous because they require the incorporation of additional components to direct coolant into thermal contact with fuel cells. The power requirements to operate fluid handling components such as pumps and cooling fans, represent an additional parasitic load on the system, thereby decreasing the net power derivable from the stack. Such additional components also add volume, weight, complexity and cost to fuel cell designs.

Many hydrogen powered fuel cells use hydrogen supply from a hydride container as the fuel. Storage of hydrogen in a container containing reversible metal hydride is a common practice in the field of fuel cells. In order to release hydrogen from the hydride container heat has to be supplied to it, as the hydrogen release reaction is endothermic. If sufficient heat is not continuously supplied to the container during hydrogen release, the hydrogen flow from the container will cease. Also, the amount of hydrogen released has to be controlled such that it matches the target power output, pressure and concentration of hydrogen in the fuel cell system One method of providing heat to the hydride container is described in U.S. Pat. No. 4,826,741. The problem with methods of the prior art that transfer heat to the fuel storage container is that they use additional components such as separator plates to circulate coolants and active components such as pumps and valves to force the coolant through the system. Even the prior art approaches that try to minimize the use of active components by creating direct thermal conduction between the fuel cell and the fuel storage container are not effective as they use separator plates and depend on conducting heat to the edge of the separator plate. This causes non-uniform cooling of the fuel cell and the degrades the overall performance of the fuel cell system.

A typical fuel cell system for portable power application will have a fuel cell assembly (either of stack or planar design) and a hydrogen source in the form of a metal hydride container. During operation of a typical fuel cell system the fuel cell produces heat while the hydride container consumes heat. Therefore a suitable thermal management method that leverages the synergy between these two components is essential for efficient operation of the fuel cell system. It is also preferable to have a thermal management method that is passive and does not require additional components and that is self-regulating.

Although prior art techniques successfully regulate the temperature of a fuel cell and keep it within acceptable limits, they do so at the expense of overall fuel cell system performance. It would therefore be an advancement in the art of fuel cell systems to have a thermal management system that uses inherent thermal behavior and synergy within a fuel cell system to regulate its operating conditions and thus obviate the need for additional components such as separator plates, coolant plates, pumps, fans, valves, etc.

BRIEF DESCRIPTION OF THE DRAWINGS

FIGS. 3–6 are sectional front views of schematic representations of a fuel cell system in accordance with alternate embodiments of the present invention.

DETAILED DESCRIPTION OF THE PREFERRED EMBODIMENT

A method and apparatus for managing thermal performance of a fuel cell system having a fuel cell assembly and a fuel storage container is disclosed. The fuel cell system consists of one or more fuel cells, each having a major surface, and disposed next to each other in a side-by-side adjacent arrangement and a fuel storage container having an exterior wall. The fuel cells are positioned such that distance between the major surfaces and the fuel storage container wall along a direction normal to the major surfaces is substantially the same. In addition, one or more of the fuel cells are in thermal contact with the fuel storage container such that cell waste heat is transferred to the fuel storage container. During typical operation, a change in an operational parameter of the fuel cell system such as power output causes a change in the amount of waste heat generated in the fuel cell and the waste heat is transferred to the fuel storage container. This change in the quantity of waste heat causes a change in a response quantity such as the amount of fuel liberated from the storage container.

Figure 1:
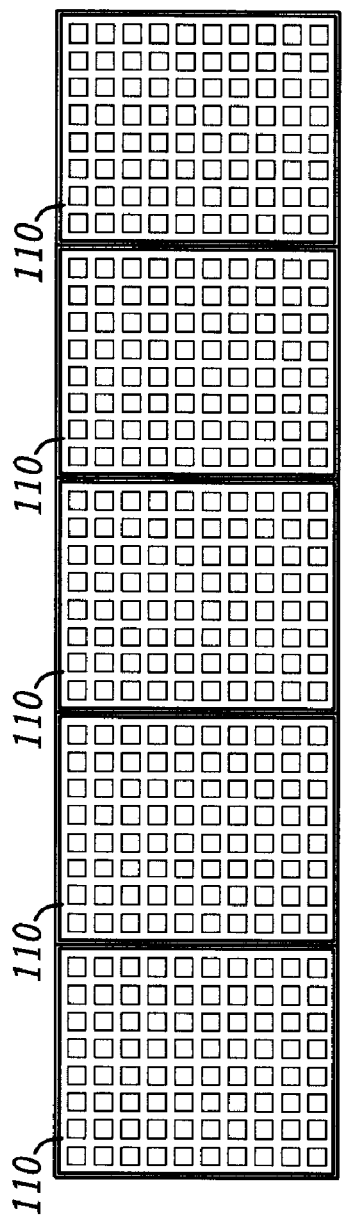
FIG. 1 is a top view of a schematic representation of a fuel cell system in accordance with the present invention.
Figure 2:
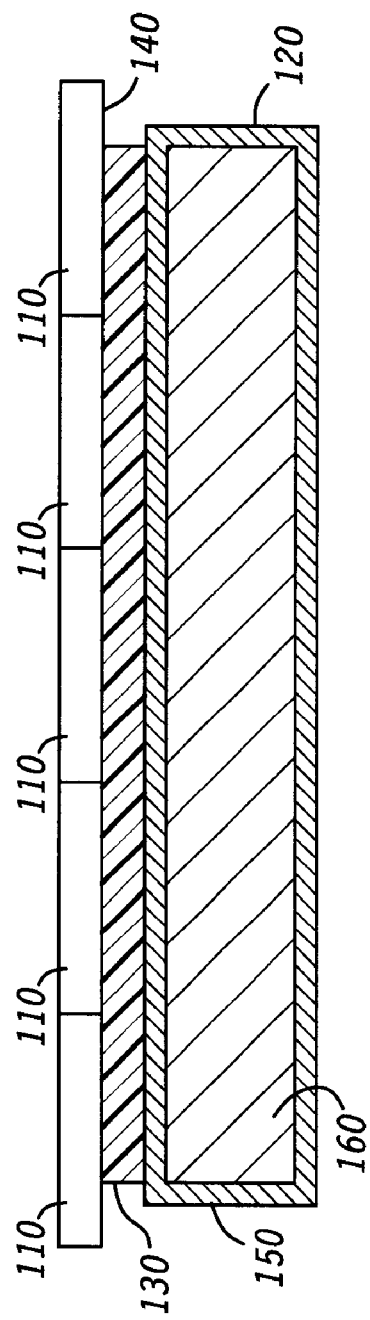
FIG. 2 is a sectional front view of a schematic representation of a fuel cell system in accordance with the present invention.

FIGS. 1 and 2 schematically show a top and a sectional view of a fuel cell system configuration illustrating a first embodiment of the present invention. Referring to FIG. 2, the fuel cell system 100 comprises one or more fuel cells 110, a fuel storage container 120 and a thermal transfer means 130. Each of the fuel cells has a major surface 140 and the fuel cells are disposed in a side-by-side adjacent arrangement. The fuel storage container has an external wall 150 and is typically filled with material 160 that can store and release the fuel on demand. As the thermal transfer means is the primary mechanism for transferring heat between the fuel cells and the storage container, it should provide a very low impedance thermal pathway.

Some alternate thermal transfer means that are suitable for the fuel cell system of the present invention are direct thermal contact between one or more fuel cells and the fuel storage container, thermal contact through a thermally conductive medium disposed between one or more fuel cells and the fuel storage container, and convection means disposed on the major surface of one or more fuel cells and the exterior wall of the fuel storage container. In addition to the thermal transfer means described above and combination of those means, many other thermal structures well known in the art can be used to implement this thermal management method without deviating from the spirit of the invention.

The thermal transfer means that connects the fuel cells with the storage container is passive without any externally assisted movement or transfer of fluid between the fuel cell surfaces and the fuel storage container wall. The system of the present invention does not use additional structural elements such as cooling plates or separator plates. It also does not have any active components such as pumps and valves to force the coolant through the system.

In the preferred embodiment, the fuel cells are of the air-breathing type using ambient air as the oxidant and hydrogen as the fuel. In addition, in the preferred embodiment, the fuel storage container contains reversible metal hydrides as the means for storing and releasing hydrogen on demand. The composition and properties of many metal hydrides suitable for this purpose are well known in the fuel cell art and will be not be further elaborated upon here. A thermally conductive medium that has high thermal conductivity and low thermal impedance at the interfaces with the fuel cells and the storage container is used in this embodiment. Some thermally conductive pads that are appropriate for this purpose are available from Raychem Corporation under the trademark HEATPATH. Many of these pads offer thermal resistance values below 2.5° C./watt. Thermal grease, which is a viscous fluid, can also used for this purpose. The thermal resistance of thermal grease material is typically less than 1.0° C./watt. In this arrangement, the primary means of heat transfer is conduction from fuel cell surfaces through the thermal pad or thermal grease to the exterior wall of the storage container.

A portion of the energy from the reaction of fuel and oxidant in a fuel cell is released as heat and this waste heat increases the operating temperature of the cell. The amount of heat generated can be different at different locations on the cell. For optimum fuel cell operation, the distribution of temperature has to be substantially uniform across the cell and should not exceed a maximum value. On the other hand, release of hydrogen from a hydride container is endothermic requiring heat to sustain the release process.

During a typical operating cycle, the power load on the fuel system will vary over time. As the load on the fuel cell increases, the amount of waste heat generated also increases, while at the same time more fuel is also required at the anode side to maintain high reaction rates. This means that more heat is required by the hydride material to release sufficient quantity of hydrogen to sustain high reaction rates. In the preferred embodiment, an increase in power load creates a larger thermal gradient across the thermal transfer means which in turn causes larger quantity of heat to be transferred from the fuel cells to the storage container. After initial transients, this thermal transfer process will reach a steady state condition where the quantity of heat transferred is passively regulated by the external power load. Passive regulation of thermal transfer rate in turn regulates the fuel release rate and the operating temperature of the fuel cell thus ensuring self-regulated operation of the fuel cell system.

Although the preferred embodiment has been described in the context of power load on the system as the target operational parameter, the present invention is not necessarily limited to this parameter. Many other operational parameters can be used with the structure described in the preferred embodiment. Some of the other common operating parameters are pressure of fuel in the system, concentration of fuel in the system, operating efficiency of fuel cells, current-voltage operating point of cells and internal resistance of cells. In the preferred embodiment, the amount of hydrogen released from the storage container has been used as the response quantity. Some of the other response quantities of interest are temperature at different points on the fuel cell, temperature of the fuel storage container and rate of fuel flow from the storage container to the fuel cells.

Figure 3:
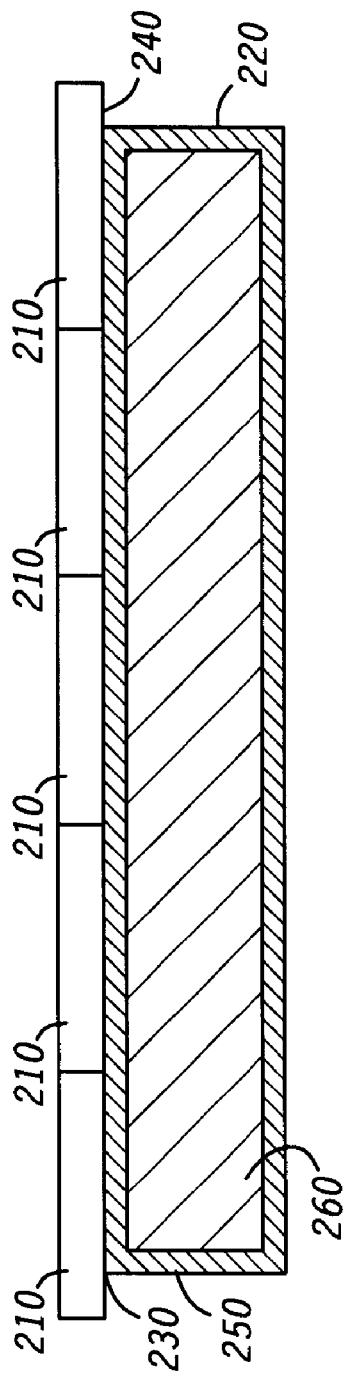

A second embodiment of the present invention shown in FIG. 3, uses direct contact between the major surfaces of the fuel cells and the exterior wall of the storage container as the thermal transfer means. In this arrangement, no thermally conducting medium is disposed between the fuel cells and the storage container. Good surface to surface contact is required for successful operation of this thermal transfer means.

Figure 4:
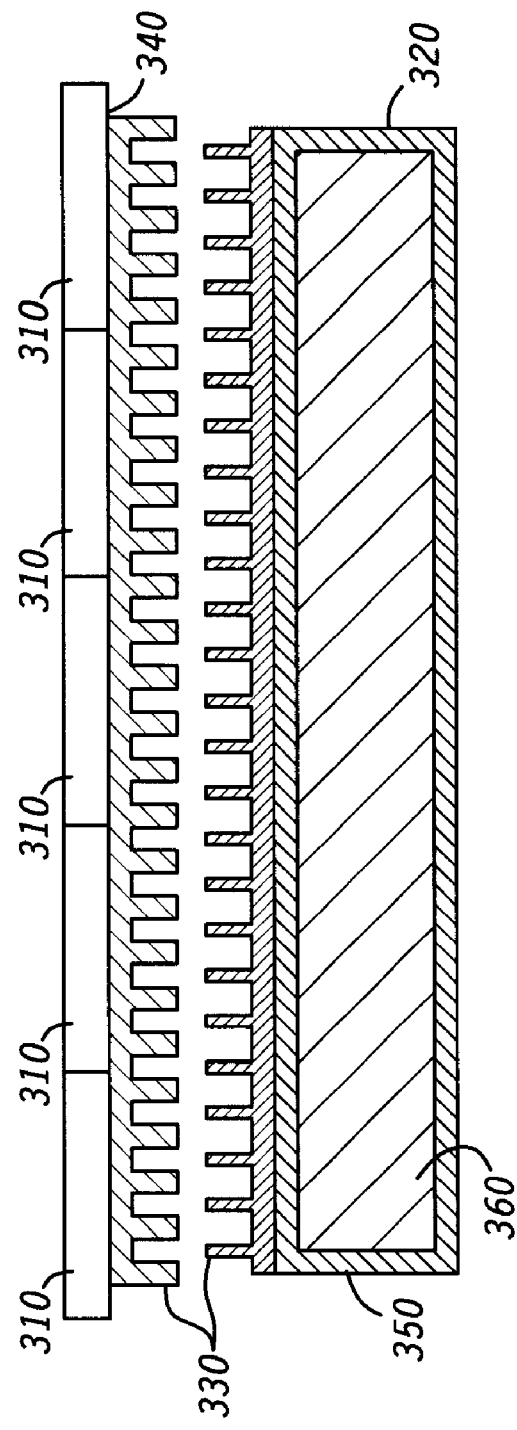

FIG. 4 shows a third embodiment of the thermal performance management system. This embodiment uses natural convection to establish thermal contact between the fuel cells and the storage container. The major surfaces of the fuel cells and the fuel storage container have fin structure 330 on their surfaces for enhancing thermal coupling between them. The thermal gradient between hot fuel cell surfaces and cold storage container wall produces motion in the air between two surfaces causing transfer of heat. Many configurations using different fin geometries and gap between the surfaces can be designed to realize suitable thermal transfer properties.

FIG. 5 shows a schematic view of an alternate embodiment of the invention. In this embodiment, the fuel storage container, the fuel cell assembly and the thermal transfer means have a non-rectangular profile in a sectional front view.

A schematic view of yet another embodiment of the invention is shown in FIG. 6. In this embodiment, the fuel cells are disposed around more than one face of the fuel storage container. Thermal contact is established between major surfaces of the fuel cells and the corresponding faces of the exterior wall of the container.

Figure 8:
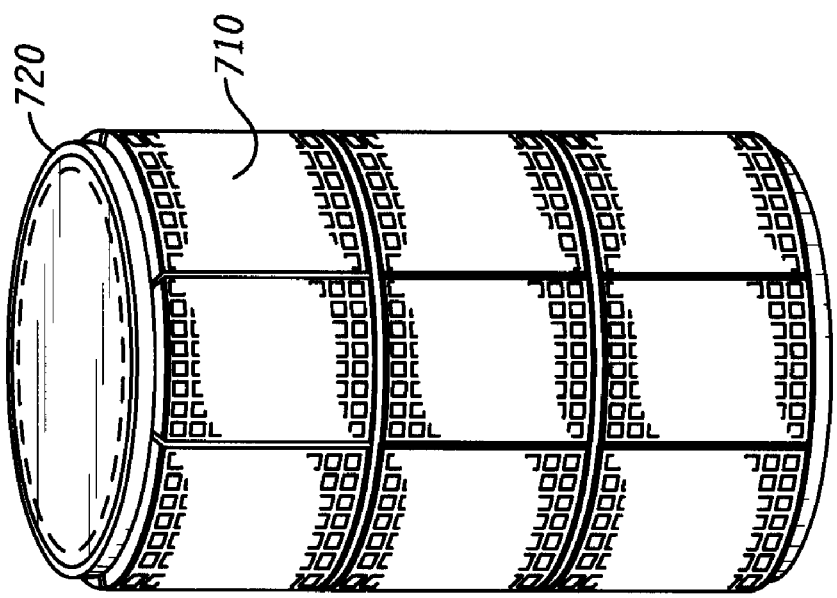
FIG. 8 is a front view of the fuel cell system shown in FIG. 7.
Figure 7:
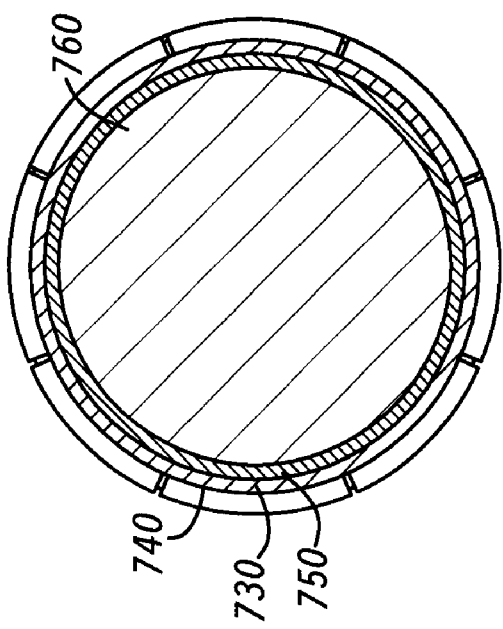
FIG. 7 is a sectional front view of a schematic representation of an alternate embodiment of a fuel cell system in accordance with the present invention

FIGS. 7 and 8 schematically show a top and a sectional front view of a fuel cell system configuration illustrating a sixth embodiment of the present invention. Referring to FIGS. 7 and 8, the fuel cell system comprises one or more fuel cells 710, a fuel storage container 720 and a thermal transfer means 730. Each of the fuel cells has a major surface 740 and the fuel cells are disposed in a side-by-side adjacent arrangement. The fuel storage container has an external wall 750 and is typically filled with material 760 that can store and release the fuel on demand. In this embodiment, the fuel storage container 720 is cylindrical in shape and the fuel cells 710 are disposed around the peripheral surface of the fuel storage container 720. Though this embodiment has been described in the context of a cylindrical fuel storage container having a circular cross-section, the invention is not limited to this storage container geometry. Many other cross-sectional shapes such as hexagon, star, oval and triangle and longitudinal configurations can be used in this embodiment without deviating from the spirit of the invention.

The present invention enhances the performance of a fuel cell system by synergistically matching the exothermic nature of fuel cell reaction with the endothermic nature of the hydrogen release process from metal hydrides. The synergistic match enables passive regulation of the desired response quantities by establishing a thermal connection between the fuel cells and the fuel storage container. This method of passive regulation using thermal gradient in the fuel cell system eliminates the problems encountered with the prior art active thermal management schemes. The passive system eliminates the need for dedicated separator and cooling plates, pumps, valves and other flow management components to circulate the fluid. The passive scheme also obviates the need for control system components required to operate an active thermal management system. In addition, side-by-side adjacent arrangement of fuel cells in conjunction with this invention produces more uniform cooling of the fuel cells. Thus, the present invention provides a method and an apparatus for managing the performance of a fuel cell which overcomes the disadvantages of the prior art methods and devices of this general type.

While the preferred embodiments of the invention have been illustrated and described, it will be clear that the invention is not so limited, and other equivalents will occur to those skilled in the art without departing from the spirit and scope of the present invention as defined by the appended claims.

What is claimed is:

1. A system for managing thermal performance of a fuel cell system comprising:
   one or more fuel cells, each having a major surface, and disposed next to each other in a side-by-side adjacent arrangement;
   a fuel storage container having an exterior wall;
   wherein one or more of the fuel cells are positioned such that the distance between the major surfaces and the fuel storage container wall along a direction normal to the major surfaces is substantially the same;
   wherein one or more of the fuel cells are in thermal contact with the fuel storage container such that a thermal output of the one or more fuel cells is transferred to the fuel storage container; and
   wherein a change in a target operational parameter of the system regulates the quantity and rate of thermal transfer between one or more of the fuel cells and the fuel storage container by:
   causing an increase in the thermal output of the one or more fuel cells when a thermal consumption requirement of the fuel storage container increases, and
   causing a decrease in the thermal output of the one or more fuel cells when the thermal consumption requirement of the fuel storage container decreases.

2. The system of claim 1, wherein the thermal contact is realized by a thermal transfer means that is a combination of one or more elements selected from the group consisting of direct thermal contact between one or more of the fuel cells and the fuel storage container, thermal contact through a thermally conductive medium disposed between one or more of the fuel cells and the fuel storage container, and convection means disposed on the major surface of one or more of the fuel cells and the exterior wall of the fuel storage container.

3. The system of claim 2, wherein the thermal transfer means is passive without any externally assisted movement or transfer of fluid between the fuel cell surfaces and the fuel storage container wall.

4. The system of claim 1, wherein one or more target operational parameters selected from the group consisting of external power load on the system, pressure of fuel in the system, concentration of fuel in the system, operating efficiency of fuel cells, current-voltage operating point of fuel cells and internal resistance of fuel cells regulates the quantity and rate of thermal transfer between the one or more of the fuel cells and the fuel storage container.

5. The system of claim 1, wherein each of the one or more fuel cells further comprises a polymer membrane electrolyte, an anode and a cathode.

6. The fuel cell of claim 1, wherein oxidant is air and fuel is hydrogen.

7. The system of claim 1, wherein the fuel storage container further comprises a hydrogen storage means that is capable of storing and releasing hydrogen.

8. A system for managing thermal performance of a fuel cell system comprising:
   one or more fuel cells, each having a major surface, and disposed next to each other in a side-by-side adjacent arrangement;
   a fuel storage container having an external wall;
   a thermal transfer means that is a combination of one or more elements selected from the group consisting of direct thermal contact between one or more of the fuel cells and the fuel storage container, thermal contact through a thermally conductive medium disposed between one or more of the fuel cells and the fuel storage container, and convection means disposed on the major surface of one or more of the fuel cells and the exterior wall of the fuel storage container;
   wherein one or more of the fuel cells are positioned such that distance between the major surfaces and the fuel storage container wall along a direction normal to the major surfaces is substantially the same;
   wherein one or more of the fuel cells are thermally connected with the fuel storage container through the thermal transfer means such that a thermal output of the one or more fuel cells is transferred to the fuel storage container; and
   wherein a change in a target operational parameter of the system regulates the quantity and rate of thermal transfer between one or more of the fuel cells and the fuel storage container by:
   causing an increase in the thermal output of the one or more fuel cells when a thermal consumption requirement of the fuel storage container increases, and
   causing a decrease in the thermal output of the one or more fuel cells when the thermal consumption requirement of the fuel storage container decreases.

9. The system of claim 8, wherein the thermal transfer means is passive without any externally assisted movement or transfer of fluid between the fuel cell surfaces and the fuel storage container wall.

10. The system of claim 8, wherein one or more target operational parameters selected from the group consisting of external power load on the system, pressure of fuel in the system, concentration of fuel in the system, operating efficiency of fuel cells, current-voltage operating point of fuel cells and internal resistance of fuel cells regulates the quantity and rate of thermal transfer between one or more of the fuel cells and the fuel storage container.

11. The system of claim 8, wherein each of the one or more fuel cells further comprises a polymer membrane electrolyte, an anode and a cathode.

12. The fuel cell of claim 8, wherein oxidant is air and fuel is hydrogen.

13. The system of claim 8, wherein the fuel storage container further comprises a hydrogen storage means that is capable of storing and releasing hydrogen.

14. A system for regulating operational parameters of a fuel cell system, comprising:
   one or more fuel cells, each having a major surface, and disposed next to each other in a side-by-side adjacent arrangement;
   a fuel storage container having an exterior wall;
   wherein one or more of the fuel cells are positioned such that distance between the major surfaces and the fuel storage container wall along a direction normal to the major surfaces is substantially the same;
   wherein one or more of the fuel cells are in thermal contact with the fuel storage container such that a thermal output of the one or more fuel cells is transferred to the fuel storage container; and
   wherein a change in one or more target operational parameters selected from the group consisting of external power load on the system, pressure of fuel in the system, concentration of fuel in the system, operating efficiency of fuel cells, current-voltage operating point of fuel cells and internal resistance of fuel cells regulates the quantity and rate of thermal transfer between one or more of the fuel cells and the fuel storage container by:
      causing an increase in the thermal output of the one or more fuel cells when a thermal consumption requirement of the fuel storage container increases, and
      causing a decrease in the thermal output of the one or more fuel cells when the thermal consumption requirement of the fuel storage container decreases.

15. The system of claim 14, wherein the thermal contact is realized by a thermal transfer means that is a combination of one or more elements selected from the group consisting of direct thermal contact between one or more of the fuel cells and the fuel storage container, thermal contact through a thermally conductive medium disposed between one or more of the fuel cells and the fuel storage container, and convection means disposed on the major surface of one or more of the fuel cells and the exterior wall of the fuel storage container.

16. The system of claim 15, wherein the thermal transfer means is passive without any externally assisted movement or transfer of fluid between the fuel cell surfaces and the fuel storage container wall.

17. The system of claim 14, wherein each of the one or more fuel cells further comprises a polymer membrane electrolyte, an anode and a cathode.

18. The fuel cell of claim 14, wherein oxidant is air and fuel is hydrogen.

19. The system of claim 14, wherein the fuel storage container further comprises a hydrogen storage means that is capable of storing and releasing hydrogen.

20. A method for regulating thermal performance of a fuel cell system, comprising:
   providing a fuel cell system having:
      one or more fuel cells, each having a major surface, and disposed next to each other in a side-by-side adjacent arrangement;
      a fuel storage container having an exterior wall;
      wherein one or more of the fuel cells are positioned such that distance between the major surfaces and the fuel storage container wall along a direction normal to the major surfaces is substantially the same; and
      wherein one or more of the fuel cells are in thermal contact with the fuel storage container such that a thermal output of the one or more fuel cells is transferred to the fuel storage container; and
   changing one or more target operational parameters selected from the group consisting of external power load on the system, pressure of fuel in the system, concentration of fuel in the system, operating efficiency of fuel cells, current-voltage operating point of fuel cells and internal resistance of fuel cells regulates the quantity and rate of thermal transfer between one or more of the fuel cells and the fuel storage container so as to cause a change in the amount of thermal output generated in the fuel cell, said thermal output is thereby transferred to the fuel storage container so as to cause a change in a response quantity, selected from the group consisting of amount of fuel liberated from the storage container, amount heat removed from the fuel cell and rate of fuel flow from the storage container to the fuel cells, in response to said change in the operational parameter,
   wherein the change in the operation parameter:
      causes an increase in the thermal output of the one or more fuel cells when a thermal consumption requirement of the fuel storage container increases, and
      causes a decrease in the thermal output of the one or more fuel cells when the thermal consumption requirement of the fuel storage container decreases.

21. The system of claim 20, wherein the thermal contact is realized by a thermal transfer means that is a combination of one or more elements selected from the group consisting of direct thermal contact between one or more of the fuel cells and the fuel storage container, thermal contact through a thermally conductive medium disposed between one or more of the fuel cells and the fuel storage container, and convection means disposed on the major surface of one or more of the fuel cells and the exterior wall of the fuel storage container.

22. The system of claim 21, wherein the thermal transfer means is passive without any externally assisted movement or transfer of fluid between the fuel cell surfaces and the fuel storage container wall.

* * * * *